United States Patent
Oda et al.

(10) Patent No.: US 9,972,935 B2
(45) Date of Patent: May 15, 2018

(54) DRAINAGE STRUCTURE FOR ELECTRICAL CONNECTION BOX

(71) Applicant: Sumitomo Wiring Systems, Ltd., Yokkaichi, Mie (JP)

(72) Inventors: Akihiro Oda, Mie (JP); Tatsuya Daidoji, Mie (JP); Ryoma Hamada, Mie (JP)

(73) Assignee: Sumitomo Wiring Systems, Ltd., Yokkaichi-shi, Mie (JP)

( * ) Notice: Subject to any disclaimer, the term of this patent is extended or adjusted under 35 U.S.C. 154(b) by 0 days. days.

(21) Appl. No.: 15/637,369

(22) Filed: Jun. 29, 2017

(65) Prior Publication Data

US 2018/0013230 A1      Jan. 11, 2018

(30) Foreign Application Priority Data

Jul. 6, 2016   (JP) .................................. 2016-134096

(51) Int. Cl.
| | |
|---|---|
| *H01R 13/527* | (2006.01) |
| *H01R 13/52* | (2006.01) |
| *H01R 13/703* | (2006.01) |
| *H02G 3/14* | (2006.01) |
| *H01H 85/20* | (2006.01) |

(52) U.S. Cl.
CPC ..... *H01R 13/5227* (2013.01); *H01R 13/7032* (2013.01); *H02G 3/14* (2013.01); *H01H 2085/208* (2013.01)

(58) Field of Classification Search
CPC ............................ H01R 13/5227; H05K 7/026
USPC ........................................ 439/76.2, 205, 206
See application file for complete search history.

(56) References Cited

U.S. PATENT DOCUMENTS

| | | | | |
|---|---|---|---|---|
| 6,774,309 | B2 * | 8/2004 | Kasai .................... | H02G 3/14 174/17 R |
| 7,172,437 | B2 * | 2/2007 | Maebashi ............... | H01H 9/10 439/205 |
| 7,179,990 | B2 * | 2/2007 | Kanazawa ............. | H02G 3/088 174/50 |
| 7,514,629 | B2 * | 4/2009 | Sasaki ................... | H02G 3/086 174/50 |

(Continued)

FOREIGN PATENT DOCUMENTS

JP       2008-172893 A       7/2008

*Primary Examiner* — Gary Paumen
(74) *Attorney, Agent, or Firm* — Dinsmore & Shohl LLP (57) ABSTRACT

Provided is a drainage structure for an electrical connection box capable of preventing an internal circuit board from getting wet even if water has entered. An electrical connection box main body is mounted on a vehicle wherein a main body-side connector is located on an upper side and protrudes from an opening in a horizontal direction, and a protruding end portion of a housing peripheral wall of a lateral electrical component attaching portion protrudes to the outside from a lateral window, the lateral electrical component attaching portion protrudes laterally from on a side edge portion of a circuit board. A first drainage channel is provided inside the electrical connection box main body, and a second drainage channel extends downward and having an upper end portion connected to the first drainage channel in the protruding end portion of the housing peripheral wall of the lateral electrical component attaching portion.

15 Claims, 6 Drawing Sheets

(56) References Cited

U.S. PATENT DOCUMENTS

| | | | | |
|---|---|---|---|---|
| 7,532,458 B2* | 5/2009 | Sasaki | B60R 16/0239 | 307/10.1 |
| 7,549,873 B2* | 6/2009 | Hayakawa | H05K 7/026 | 439/34 |
| 7,671,275 B2* | 3/2010 | Kubota | H01R 13/5227 | 174/17 R |
| 7,775,807 B2* | 8/2010 | Yamaguchi | H01R 9/2466 | 439/206 |
| 7,883,342 B2* | 2/2011 | Yoshida | H01R 13/5227 | 439/205 |
| 7,950,930 B2* | 5/2011 | Yoshida | H02G 3/081 | 439/205 |
| 8,338,704 B2* | 12/2012 | Mizukami | B60R 16/0239 | 174/50 |
| 8,383,963 B2* | 2/2013 | Ejima | B60R 16/0238 | 174/541 |
| 2001/0003069 A1* | 6/2001 | Sekido | H01H 85/2045 | 439/76.2 |
| 2003/0045137 A1* | 3/2003 | Yamane | B60R 16/0238 | 439/76.2 |
| 2003/0219998 A1* | 11/2003 | Kakuta | H01R 13/5227 | 439/76.2 |
| 2004/0214458 A1* | 10/2004 | Maebashi | H01H 9/10 | 439/76.2 |
| 2005/0186811 A1* | 8/2005 | Lee | H01R 13/514 | 439/76.2 |
| 2006/0030175 A1* | 2/2006 | Yamane | H01H 85/2045 | 439/76.2 |
| 2008/0299799 A1* | 12/2008 | Yoshida | H01R 13/5227 | 439/76.2 |
| 2009/0298310 A1* | 12/2009 | Nakanishi | H02G 3/088 | 439/76.2 |
| 2009/0298311 A1* | 12/2009 | Nakanishi | H02G 3/088 | 439/76.2 |

* cited by examiner

DRAINAGE STRUCTURE FOR ELECTRICAL CONNECTION BOX

CROSS-REFERENCE TO RELATED APPLICATIONS

This application claims priority of Japanese Patent Application No. JP 2016-134096 filed Jul. 6, 2016.

TECHNICAL FIELD

The present invention relates to a drainage structure for an electrical connection box in which an attachment, which is a separate member such as a control device, is attached and connected to an electrical connection box main body via connectors.

BACKGROUND ART

Electrical connection boxes that are to be mounted on an automobile house, for example, a wiring board on which electronic components are mounted, and an insulation board to which a bus bar is attached. As disclosed in JP 2008-172893A, for example, there is an electrical connection box known as one type of such electrical connection box, in which an electronic control unit that houses a control circuit, such as an ECU, is detachably attached to an electrical connection box main body as a separate attachment. Such an electrical connection box has an advantage in that the electronic control unit is a separate structure and therefore it is easy to replace or change the electronic control unit, for example.

Such an electrical connection box that includes an electrical connection box main body and an attachment structure has connectors, which are respectively provided at corresponding positions on an attaching surface of the electrical connection box main body and an alignment surface of the attachment that is to be aligned with the attaching surface. Specifically, an opening is provided in the attaching surface of the electrical connection box main body so as to penetrate therethrough, and a portion of a main body-side connector protrudes to the outside via the opening. The main body-side connector is provided on an internal circuit board so as to protrude therefrom. An attachment-side connector is provided on the alignment surface of the attachment so as to protrude therefrom. When the attachment is to be attached to the electrical connection box main body, the main body-side connector and the attachment-side connector are connected to each other, and thus electrical circuits provided on the electrical connection box main body and electrical circuits provided on the attachment are interconnected so as to be conductive.

However, in such an electrical connection box with a conventional structure, an opening is provided in the attaching surface of the electrical connection box main body, and therefore, when the electrical connection box gets wet, there is the risk of water entering the inside of the connector via the opening. Since the opening of the electrical connection box main body is to be covered by the attached attachment from the outside, no specific drainage structure has been provided to drain water that has entered from the opening. Therefore, there is the risk of a failure such as a short circuit occurring due to the internal circuit board getting wet when water, which has reached the opening of the electrical connection box main body via a gap between opposed surfaces of the electrical connection box main body and the attachment, enters the inside from the opening.

SUMMARY

The present invention has been made in view of the above-described circumstances, and an objective thereof is to provide a novel drainage structure for an electrical connection box, which is capable of advantageously preventing an internal circuit board from getting wet even if water has entered the inside from an opening of the electrical connection box main body.

A first aspect of the present invention is a drainage structure for an electrical connection box, comprising: an electrical connection box main body; and an attachment that is a separate member and is aligned with and attached to an attaching surface that is provided within a top surface of the electrical connection box main body, wherein an opening is provided in the attaching surface of the electrical connection box main body so as to penetrate therethrough, a main body-side connector protrudes to the outside via the opening, the main body-side connector being provided on a circuit board in the electrical connection box main body so as to protrude therefrom, and an attachment-side connector is provided on an alignment surface of the attachment so as to protrude therefrom, and the attachment is aligned with and attached to the electrical connection box main body, and thus the main body-side connector and the attachment-side connector are connected to each other, wherein the electrical connection box main body is configured to be mounted on a vehicle such that the main body-side connector is located on an upper side and protrudes from the opening in a horizontal direction, a lateral window is provided in a lateral surface of the electrical connection box main body so as to penetrate therethrough, and a protruding end portion of a housing peripheral wall of a lateral electrical component attaching portion protrudes to the outside from the lateral window, the lateral electrical component attaching portion being provided on a side edge portion of the circuit board so as to protrude in a lateral direction therefrom, a first drainage channel that is inclined downward from an upper surface of a housing peripheral wall of the main body-side connector toward an upper surface of the housing peripheral wall of the lateral electrical component attaching portion is provided inside the electrical connection box main body, and a second drainage channel that extends downward and whose upper end portion is connected to the first drainage channel is provided in the protruding end portion of the housing peripheral wall of the lateral electrical component attaching portion.

According to this aspect, the attachment, which is a separate member, is attached to the top surface of the electrical connection box main body. Therefore, the electrical component attaching portion, to which a connector, a fuse, and so on that are to be connected to an internal circuit (a circuit board) of the electrical connection box main body are attached, is provided on a lateral side of the electrical connection box main body. Therefore, considering the ease of assembly, the electrical connection box is attached to a vehicle in a so-called vertical orientation, in which the main body-side connector is located on the upper side and protrudes from the opening in a horizontal direction. In this case, there is the risk of water entering the inside from the opening of the electrical connection box main body located on the upper side. However, according to the first aspect, the first drainage channel that is inclined downward from the upper surface of the housing peripheral wall of the main body-side connector toward the upper surface of the housing peripheral wall of the lateral electrical component attaching portion is provided. Therefore, water that has entered the inside from the opening of the electrical connection box main body located on the upper side can be immediately guided to the upper surface of the housing peripheral wall of the lateral electrical component attaching portion. Furthermore, a second drainage channel that extends downward and whose upper end portion is connected to the first drainage channel is provided in the protruding end portion of the housing peripheral wall of the lateral electrical component attaching portion, the protruding end portion protruding to the outside from the lateral window of the electrical connection box main body. Therefore, water in the first drainage channel is guided by the second drainage channel that is provided in the protruding end portion of the housing peripheral wall of the lateral electrical component attaching portion that protrudes to the outside of the electrical connection box, and is guided downward and is drained, outside the electrical connection box main body. Thus, the circuit board and so on in the electrical connection box are more reliably prevented from getting wet.

In addition, the second drainage channel is provided by utilizing the peripheral wall of the lateral electrical component attaching portion that protrudes from the inside to the outside of the electrical connection box main body. Therefore, it is possible to efficiently promote the drainage of water to the outside without increasing the size or the number of components of the electrical connection box.

A second aspect of the present invention is the drainage structure according to the first aspect, wherein a casing of the electrical connection box main body is provided with a connecting wall that extends in a lengthwise direction of the main body-side connector along a separation gap between the upper surface of the housing peripheral wall of the main body-side connector and the upper surface of the housing peripheral wall of the lateral electrical component attaching portion to close the separation gap, the upper surface of the housing peripheral wall of the main body-side connector is inclined downward toward the connecting wall, and the upper surface of the connecting wall is inclined downward from the main body-side connector toward the lateral electrical component attaching portion, and the first drainage channel includes the upper surface of the housing peripheral wall of the main body-side connector, the upper surface of the connecting wall, and the upper surface of the housing peripheral wall of the lateral electrical component attaching portion.

According to this aspect, the first drainage channel can be formed with excellent spatial efficiency by employing a simple configuration in which the upper surface of the housing peripheral wall of the main body-side connector and the upper surface of the housing peripheral wall of the lateral electrical component connection portion are inclined downward. In addition, if the main body-side connector and the lateral electrical component connection portion are separated from each other in the lengthwise direction of the main body-side connector, the first drainage channel can be efficiently formed by employing a configuration in which the connecting wall that closes the separation gap between the main body-side connector and the lateral electrical component connection portion is provided on the casing of the electrical connection box main body so as to extend along the separation gap between the main body-side connector and the lateral electrical component connection portion, and the upper surface of the connecting wall is inclined downward toward the lateral electrical component connection portion.

A third aspect according to the present invention is the drainage structure according to the first or the second aspect, wherein the protruding end portion of the housing peripheral wall of the lateral electrical component attaching portion includes a bottom-side end portion that is located on the side of a bottom surface of the electrical connection box main body and protrudes outward from the lateral window, and the second drainage channel is provided by extending the bottom-side end portion downward, the upper surface of the housing peripheral wall of the lateral electrical component attaching portion is provided with a bottom-side extension portion that extends toward the bottom-side end portion of the lateral electrical component attaching portion, and the first drainage channel includes the bottom-side extension portion.

The protruding end portion of the housing peripheral wall of the lateral electrical component attaching portion includes a bottom-side end portion that is located on the side of a bottom surface of the electrical connection box main body and protrudes outward from the lateral window, and the second drainage channel is provided by extending the bottom-side end portion downward, the upper surface of the housing peripheral wall of the lateral electrical component attaching portion is provided with a bottom-side extension portion that extends toward the bottom-side end portion of the lateral electrical component attaching portion, and the first drainage channel includes the bottom-side extension portion.

In addition, the bottom-side extension portion that extends toward the bottom-side end portion of the lateral electrical component attaching portion is provided on the upper surface of the lateral electrical component attaching portion, and the first drainage channel is reliably connected to the second drainage channel provided in the bottom-side end portion. Therefore, it is possible to perform more reliable waterproofing and more immediate drainage.

A fourth aspect of the present invention is the drainage structure according to any one of the first to the third aspects, wherein the protruding end portion of the housing peripheral wall of the lateral electrical component attaching portion includes a bottom-side end portion that is located on the side of a bottom surface of the electrical connection box main body and protrudes outward from the lateral window, the bottom-side end portion has a double-walled structure that includes an outer peripheral wall portion that extends from an upper end to a lower end of the lateral window and covers the housing peripheral wall from an outer periphery side, and the second drainage channel is provided so as to extend from an upper end to an lower end of the outer peripheral wall portion.

According to this aspect, the bottom-side end portion of the lateral electrical component attaching portion that protrudes outward from the lateral window of the electrical connection box main body has a double-walled structure that includes an outer peripheral wall portion that extends from an upper end to a lower end of the lateral window and covers the housing peripheral wall from an outer periphery side, and the second drainage channel is provided in the external peripheral wall portion that is provided on the side of the outer peripheral wall portion of the double-walled structure. Therefore, it is possible to more reliably guide water to the outside of the electrical connection box main body, and advantageously prevent water from entering the inside.

In addition, the external peripheral wall portion extends from an upper end to a lower end of the lateral window. Therefore, it is possible to immediately drain water from the upper side to the lower side, outside the window from which water can enter inside, and to more reliably perform waterproofing.

A fifth aspect of the present invention is the drainage structure according to the forth aspect, wherein a drainage hole is provided in a lower end portion of the housing peripheral wall of the lateral electrical component attaching portion so as to penetrate through the lower end portion, the lower end portion being located on the lower side when in the state of being mounted on the vehicle.

According to this aspect, a drainage hole is provided in a lower end portion of the housing peripheral wall of the lateral electrical component attaching portion so as to penetrate through the lower end portion, the lower end portion being located on the lower side when in the state of being mounted on the vehicle. Therefore, even if water enters the inside of the housing peripheral wall, it is possible to drain water from the drainage hole to the outside.

A sixth aspect of the present invention is the drainage structure according to any one of the first to the fifth aspects, wherein the lateral electrical component attaching portion that protrudes from the lateral window of the electrical connection box main body includes a plurality of lateral electrical component attaching portions, and the casing of the electrical connection box main body is provided with a waterproofing wall that is inserted into a separation gap between the housing peripheral walls of the plurality of lateral electrical component attaching portions and protrudes therefrom to prevent water from entering the inside from the separation gap.

According to this aspect, even in the case where the plurality of lateral electrical component attaching portions are provided adjacent to each other with a gap therebetween, the waterproofing wall that protrudes from the casing is inserted into the gap therebetween. Therefore, even if water enters the inside from the gap between the lateral electrical component attaching portions, the waterproofing wall prevents water from reaching the internal circuit board.

A seventh aspect of the present invention is the drainage structure according to the first aspect, wherein the first drainage channel includes a pair of downwardly-inclined surfaces that are respectively inclined downward from a central portion of the upper surface of the housing peripheral wall of the main body-side connector in a widthwise direction toward the side edge portions on two sides in the widthwise direction.

According to this aspect, a pair of downwardly-inclined surfaces that are respectively inclined downward from a central portion of the upper surface of the housing peripheral wall of the main body-side connector in a widthwise direction toward the side edge portions on two sides in the widthwise direction are provided. Therefore, water can be immediately guided toward the two sides regardless of where water flows to on the upper surface.

According to the present invention, the electrical connection box is attached to a vehicle in a so-called vertical orientation, in which the main body-side connector is located on the upper side and protrudes from the opening in a horizontal direction. In this case, there is the risk of water entering the inside from the opening of the electrical connection box main body located on the upper side. However, the first drainage channel that is inclined downward from the upper surface of the housing peripheral wall of the main body-side connector toward the upper surface of the housing peripheral wall of the lateral electrical component attaching portion is provided. Therefore, water that has entered the inside from the opening of the electrical connection box main body located on the upper side can be immediately guided to the upper surface of the housing peripheral wall of the lateral electrical component attaching portion. Furthermore, a second drainage channel that extends downward and whose upper end portion is connected to the first drainage channel is provided in the protruding end portion of the housing peripheral wall of the lateral electrical component attaching portion, the protruding end portion protruding to the outside from the lateral window of the electrical connection box main body. Therefore, water in the first drainage channel is guided by the second drainage channel, and is guided downward and is drained, outside the electrical connection box main body. Thus, the circuit board and so on in the electrical connection box are more reliably prevented from getting wet. In addition, the second drainage channel is provided by utilizing the peripheral wall of the lateral electrical component attaching portion. Therefore, it is possible to efficiently prompt water to drain to the outside without increasing the size or the number of components of the electrical connection box.

DETAILED DESCRIPTION OF PREFERRED EMBODIMENTS

The following describes an embodiment of the present invention with reference to the drawings.

Figure 1:
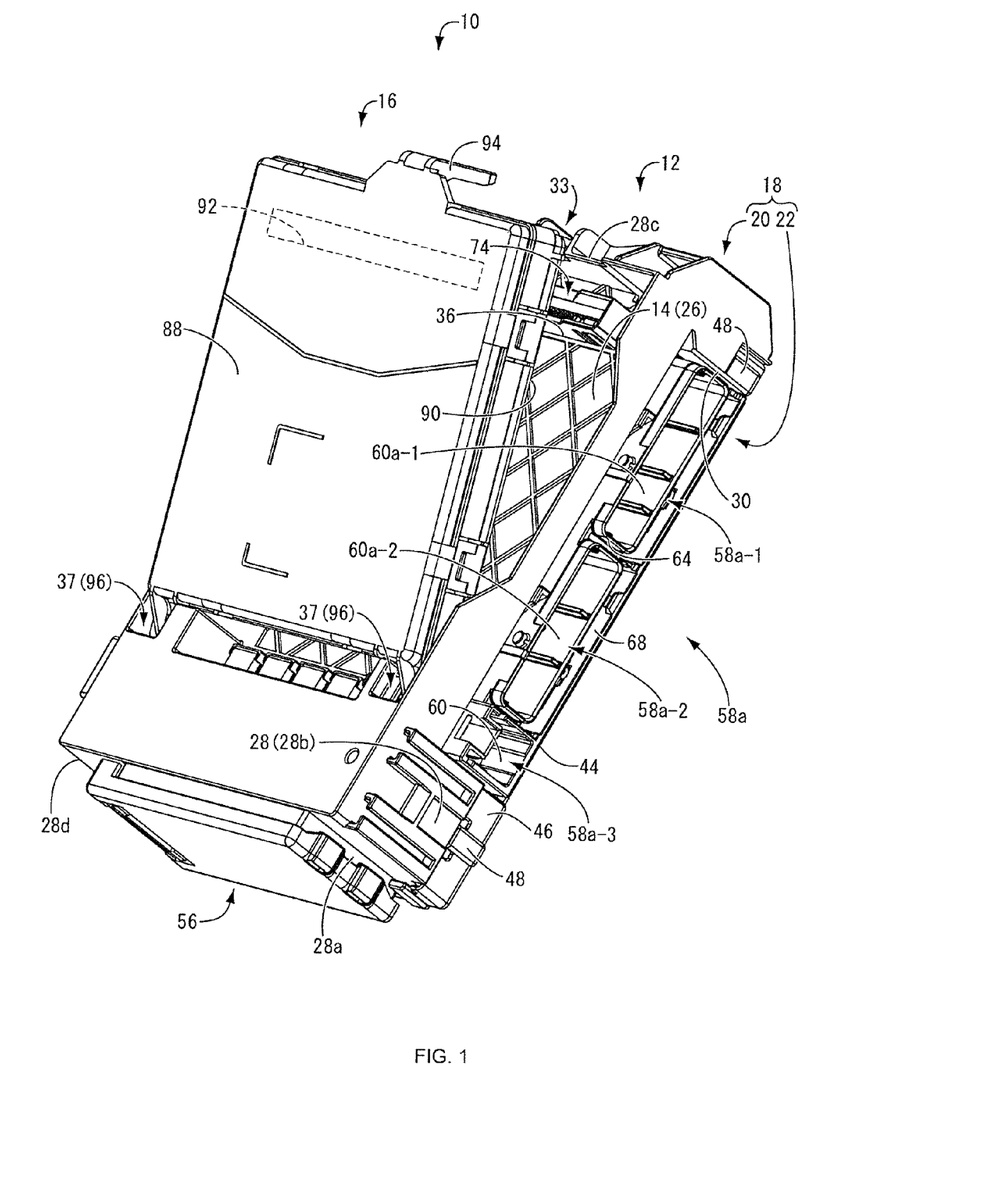
FIG. 1 is a perspective view showing an electrical connection box in the process of assembly, the electrical connection box having a drainage structure for an electrical connection box according to an embodiment of the present invention.

FIGS. 1 to 6 show an electrical connection box 10 that has a drainage structure for an electrical connection box according to an embodiment of the present invention. As shown in FIG. 1, the electrical connection box 10 includes an electrical connection box main body 12, and an attachment 16 that is a separate member and is aligned with and attached to an attaching surface 14 that is provided within a top surface of the electrical connection box main body 12. The electrical connection box main body 12 includes an upper casing 20 and a lower casing 22 that constitute a casing 18 (see FIGS. 1 and 2), and a circuit board 24 is enclosed by the upper casing 20 and the lower casing 22 (see FIGS. 4 and 5). Note that, in the following description, "upward" refers to an upward direction in FIG. 2, and "downward" refers to a downward direction in FIG. 2. Similarly, "forward" refers to a direction toward the upper casing 20 in FIG. 2, "rearward" refers to a direction toward the lower casing 22 in FIG. 2.

Figure 6:
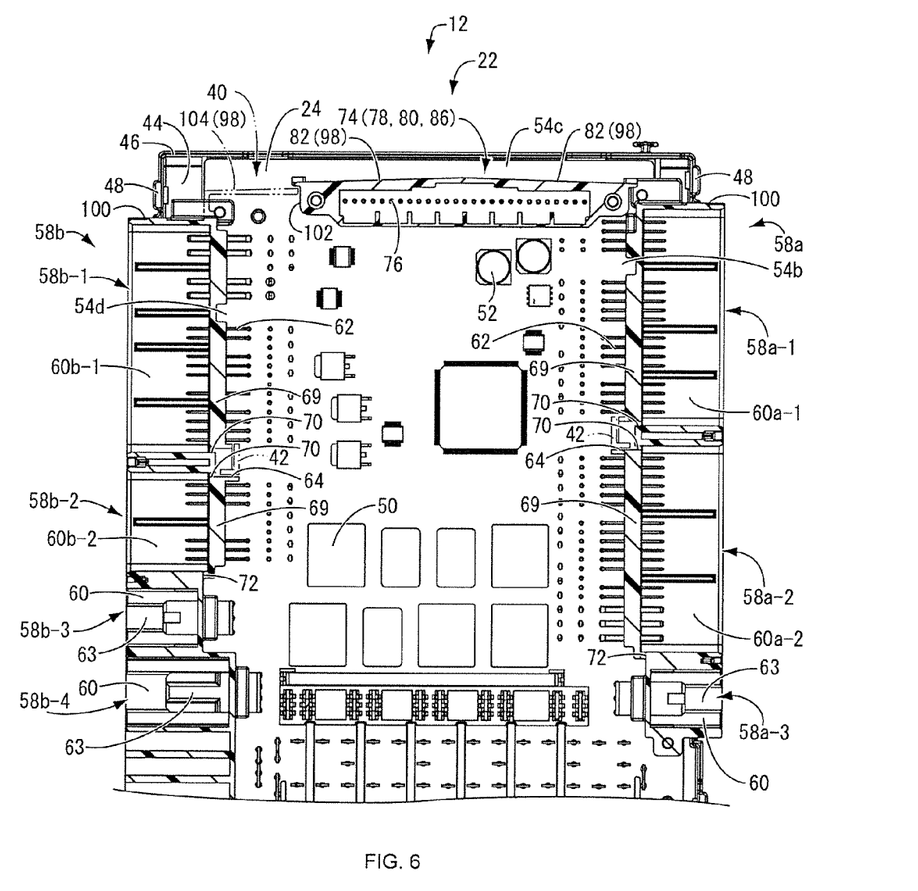
FIG. 6 is a lateral cross-sectional view of the electrical connection box main body shown in FIG. 2, and shows a situation where a main body-side connector and a lateral component attachment portion that are attached to a circuit board are cut in parallel with the circuit board.

Furthermore, "a lengthwise direction" refers to a top-bottom direction in FIG. 6, and "a widthwise direction" refers to a left-right direction in FIG. 6.

Figure 4:
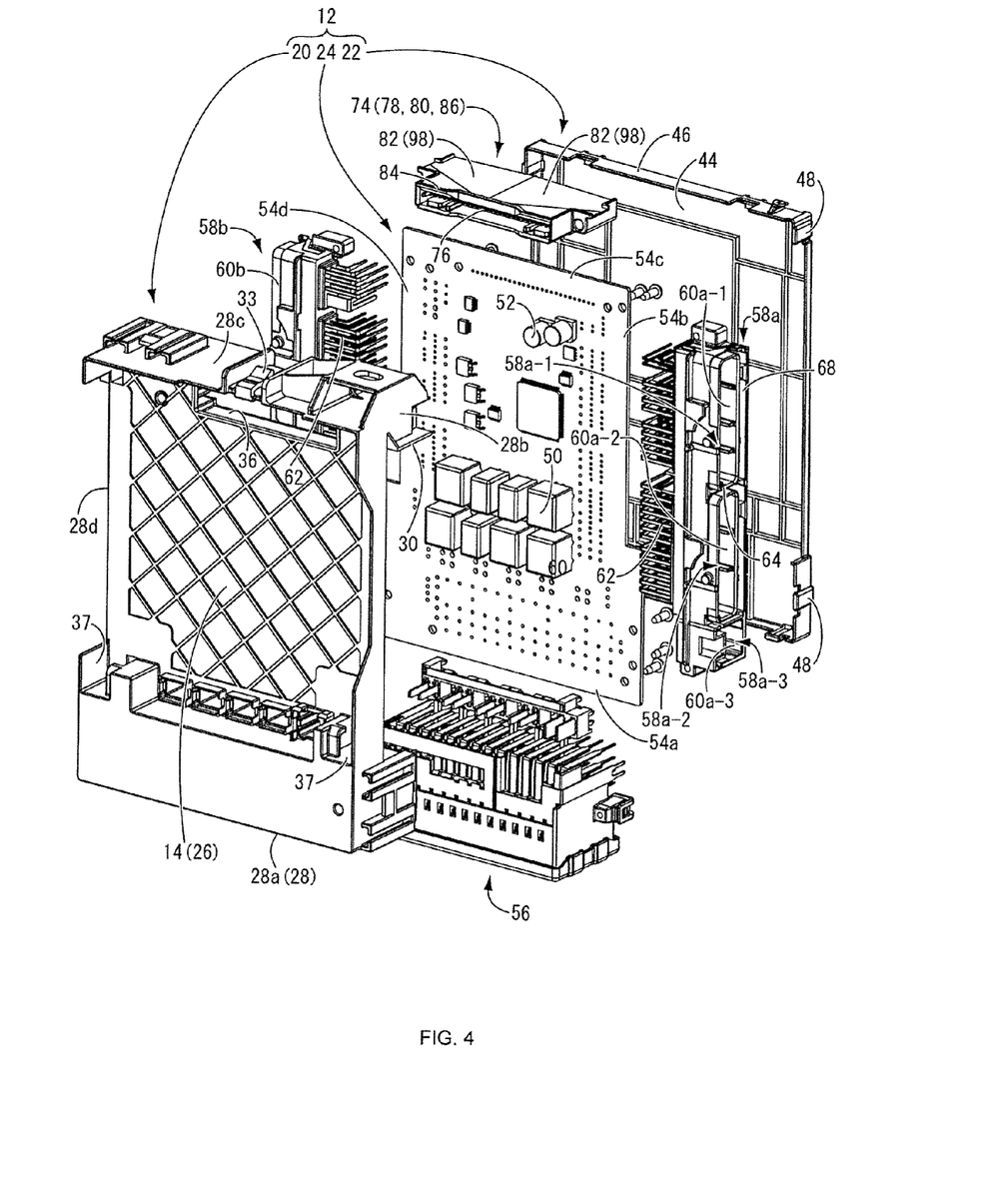
FIG. 4 is an exploded perspective view of the electrical connection box main body shown in FIG. 2.
Figure 5:
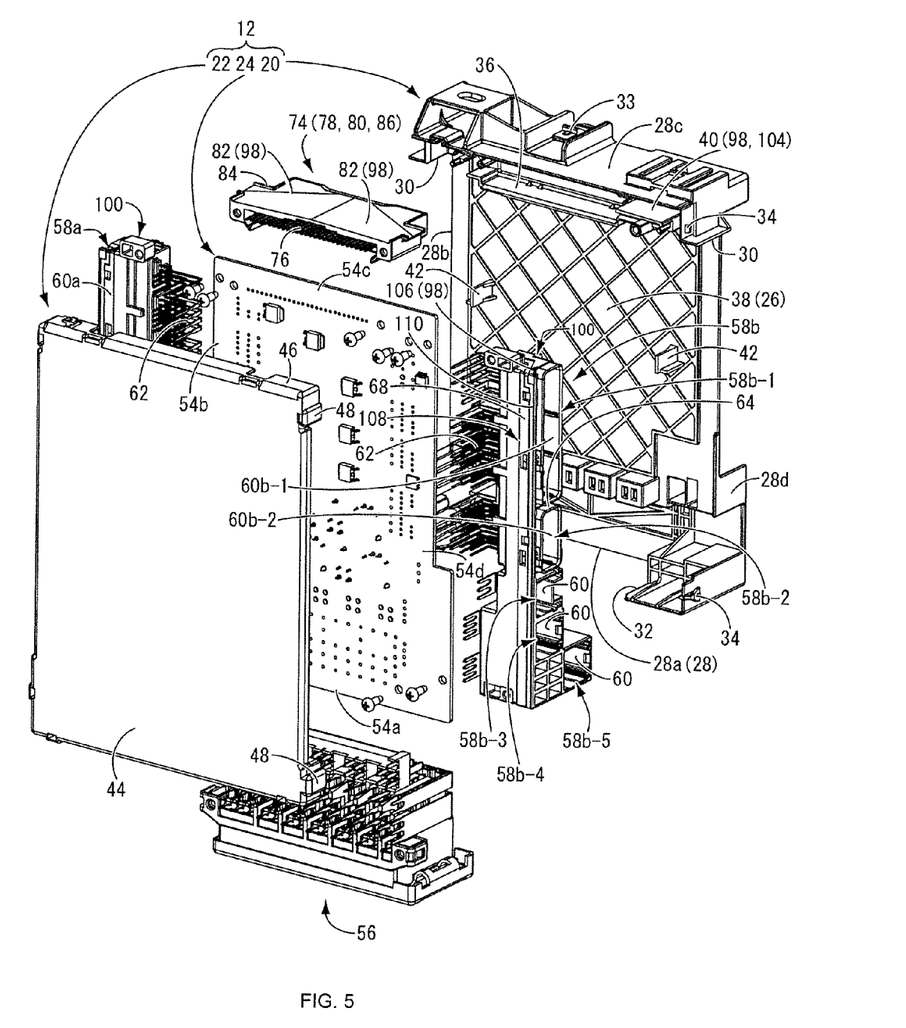
FIG. 5 is an exploded perspective view of the electrical connection box main body shown in FIG. 3.

The upper casing 20 is an integrally-molded member that is made of a synthetic resin. As shown in FIGS. 4 and 5, the upper casing 20 has a substantially box-like shape that is open rearward, and a peripheral wall portion 28 that protrudes rearward (toward the lower casing 22) is formed on an outer peripheral edge portion of a front wall 26 that has a substantially rectangular plate-like shape. The upper casing 20 has a structure in which: lateral windows 30 that are open outward and have a substantially rectangular cutout shape are provided so as to respectively penetrate through peripheral wall portions 28b and 28d that are located on the two sides in a widthwise direction (a left-right direction in FIG. 5); and a cutout portion 32 that is open downward and has a substantially rectangular shape is provided so as to penetrate through a peripheral wall portion 28a on the lower end side. Also, a peripheral wall portion 28c that faces the peripheral wall portion 28a on one end side of the upper casing 20 in a lengthwise direction is provided with a lock portion 33 that interlocks with a lock-target portion 94 of the attachment 16, which will be described later. Furthermore, lock portions 34 are respectively provided at the four corners of a peripheral wall portion 28 of the upper casing 20.

Figure 2:
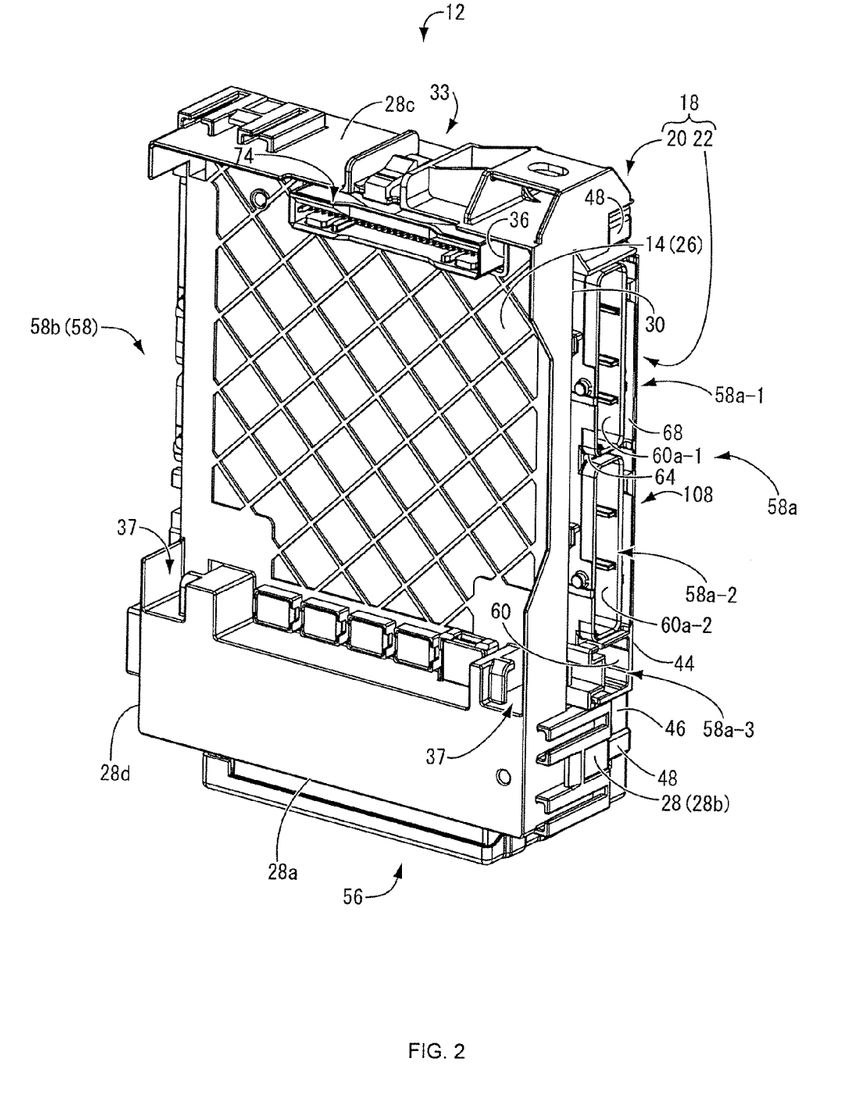
FIG. 2 is a perspective view of an electrical connection box main body shown in FIG. 1.

In addition, as shown in FIGS. 2 and 4, the attaching surface 14 is formed within the top surface of the front wall 26 of the upper casing 20, and an opening 36 that has a substantially rectangular and horizontally-elongated shape in front view is provided in an upper end portion of the attaching surface 14 so as to penetrate therethrough. The opening 36 extends along an upper edge portion and is located off-center toward one side in a widthwise direction (rightward in FIGS. 2 and 4). Also, a pair of supporting portions 37 are respectively provided at two end portions, in a widthwise direction, of the attaching surface 14 on the other end side (a lower side in FIG. 2). The other end side is opposite the one end side (an upper side in FIG. 2) where the opening 36 is provided, in a lengthwise direction. Furthermore, as shown in FIG. 5, a back surface 38 of the front wall 26 of the upper casing 20 is provided with a connecting wall 40 that has a substantially rectangular flat plate-like shape in plan view, extends from the opening 36 along the upper edge portion so as to protrude rearward (toward the lower casing 22), and is gently inclined downward. The connecting wall 40 is located on the other side (the right side in FIG. 5) of the opening 36 in a widthwise direction. In addition, as shown in FIG. 5, the back surface 38 of the upper casing 20 is provided with a pair of waterproofing walls 42 that have a substantially L-like cross section and extend rearward (toward the lower casing 22). The pair of waterproofing walls 42 are respectively located in central portions, in a top-bottom direction, of side edge portions on the two sides in a widthwise direction.

The lower casing 22 is an integrally-molded member that is made of a synthetic resin. As shown in FIG. 4, the lower casing 22 has a substantially box-like shape that is open forward, and a peripheral wall 46 that protrudes forward is formed on an outer peripheral edge portion of a bottom wall 44 that has a substantially rectangular plate-like shape. Also, lock-target portions 48 are provided at the four corners of the peripheral wall 46 of the lower casing 22. The lock-target portions 48 interlock with the lock portions 34 of the upper casing 20, and thus the lower casing 22 and the upper casing 20 can be kept in an attached state.

As shown in FIG. 4, the circuit board 24 has a substantially rectangular plate-like shape, and various kinds of electrical components such as a relay 50 and a capacitor 52 are provided on a central portion of the circuit board 24 as appropriate. A fuse module 56, which is a lateral electrical component connection portion, is mounted on an outer peripheral portion 54a of one side of the circuit board 24. A plurality of fuse attaching portions, which are not shown, are formed on the fuse module 56.

Also, connector attaching portions 58a-1 to 58a-3 and 58b-1 to 58b-5, which are lateral electrical component connection portions, are respectively provided on outer peripheral portions 54b and 54d of the two sides of the circuit board 24 that are orthogonal to the outer peripheral portion 54a, so as to extend substantially along the entire length of the outer peripheral portions 54b and 54d. Housing peripheral walls 60 of the connector attaching portions 58a-1 to 58a-3 and 58b-1 to 58b-5 are each made of a synthetic resin and have a bottomed tubular shape that is open toward a side of the circuit board 24. As shown in FIGS. 4 to 6, the pair of housing peripheral walls 60a-1 and 60a-2 of the connector attaching portions 58a-1 and 58a-2, and the pair of housing peripheral walls 60b-1 and 60b-2 of the connector attaching portions 58b-1 and 58b-2, are each provided adjacent to each other with a gap therebetween in a top-bottom direction. A plurality of board terminals 62 that are bent so as to have an L-shape, and tab terminals 63 are inserted into the housing peripheral walls 60, and thus the connector attaching portions 58a-1 to 58a-3 and 58b-1 to 58b-5 are formed. Furthermore, the connector attaching portions 58a-1 to 58a-3 and 58b-1 to 58b-5 have a double-walled structure including an outer peripheral wall portion 68 that covers the entirety of the corresponding housing peripheral walls 60 from an outer periphery side. The outer peripheral wall portions 68 are located on the sides of the lower casing 22, namely on the sides of the bottom surface of the electrical connection box main body 12. As shown in FIG. 6, water removal holes 70 are provided in areas where bottom walls 69 of the connector attaching portions 58a-1 and 58a-2 and the connector attaching portions 58b-1 and 58b-2 are adjacent to each other, so as to penetrate through the circuit board 24 inward. Furthermore, drainage holes 72 are provided in lower end portions of the housing peripheral walls 60a-2 and 60b-2, from among the housing peripheral walls 60 of the connector attaching portions 58a-1 to 58a-3 and 58b-1 to 58b-5, so as to penetrate through the lower end portions downward, the lower end portions being located on the lower side when in the state of being mounted on a vehicle (see FIG. 6), which will be described later.

Furthermore, a main body-side connector 74 that has a substantially rectangular and horizontally-elongated shape and protrudes forward is provided in an outer peripheral portion 54c of the circuit board 24, which is the side opposite the outer peripheral portion 54a, so as to extend along the outer peripheral portion 54c. As shown in FIGS. 4 and 5, the main body-side connector 74 includes: terminals 76 that are connected to the circuit board 24 and are used to electrically connect to the attachment 16; and a housing peripheral wall 78 that is made of a synthetic resin, is formed so as to have a substantially rectangular tubular shape, and houses the terminals 76. As shown in FIG. 6, the terminals 76 are orderly arranged so as to spread in the widthwise direction of the opening 36. Two end portions of the main body-side connector 74 in the widthwise direction are fixed to the circuit board 24 using bolts.

As shown in FIG. 6, an upper surface 80 of the housing peripheral wall 78 of the main body-side connector 74 includes a pair of first downwardly-inclined surfaces 82 that are respectively inclined downward from a central portion of the upper surface 80 in the widthwise direction toward the side edge portions on the two sides in the widthwise direction. Also, a protruding wall 84 that has a flat plate-like shape and protrudes upward is provided on peripheral edge portions of the pair of first downwardly-inclined surfaces 82, excluding side edge portions on the two sides in the widthwise direction (see FIGS. 4 and 5). Furthermore, as shown in FIG. 4, an upper wall 86 of the housing peripheral wall 78 is formed so as to spread from a protruding end portion of the main body-side connector 74 to the circuit board 24. Thus, the terminals 76 that are provided so as to stand on the circuit board 24 are reliably covered by the upper wall 86 of the housing peripheral wall 78 from above.

The circuit board 24 that is configured as described above is housed in a space between the upper casing 20 and the lower casing 22, and thus the electrical connection box main body 12 is configured. As shown in FIG. 2, in such a housed state, the main body-side connector 74 that is provided on the circuit board 24 protrudes to the outside, i.e., protrudes above the attaching surface 14, via the opening 36 that is provided in the attaching surface 14.

The attachment 16 is an electronic control unit of a vehicle such as an ECU. As shown in FIG. 1, the attachment 16 is attached to and electrically connected to the electrical connection box main body 12 so as to be supplied with power from the electrical connection box main body 12, and controls electronic components such as the relay 50 that are mounted in the electrical connection box main body 12. Note that the electrical connection box 10 according to the present invention includes a junction block, a fuse box, a relay box, and so on.

As shown in FIG. 1, the attachment 16 has a structure in which a circuit board, which is not shown, is housed in a casing 88 that is made of a synthetic resin. The casing 88 has a rectangular shape that is substantially the same as the attaching surface 14 of the electrical connection box main body 12 in plan view. In a situation where the attachment 16 is attached to the electrical connection box main body 12, a bottom surface 90 of the casing 88 serves as an alignment surface that is to be aligned with the attaching surface 14.

As shown in FIG. 1, the circuit board (not shown) housed in the casing 88 is provided with an attachment-side connector 92 that connects to the main body-side connector 74 provided on the circuit board 24 of the electrical connection box main body 12. The attachment-side connector 92 extends along one end side of the casing 88 in the lengthwise direction (upward in FIG. 1), and protrudes toward the main body-side connector 74 from a position that is opposite the main body-side connector 74 when the bottom surface 90 of the casing 88 is parallel with and faces the attaching surface 14 of the electrical connection box main body 12. In other words, the attachment-side connector 92 is provided so as to protrude from the bottom surface 90, which is the alignment surface of the attachment 16. Also, the lock-target portion 94 is provided so as to protrude from a side wall on one end side of the casing 88 in the lengthwise direction, and a pair of rotary portions 96 are respectively provided on two end portions of a side wall on the other end side of the casing 88 that is opposite the one end side in the lengthwise direction.

To attach the electrical connection box main body 12 and the attachment 16 that have the above-described structures to each other, first, as shown in FIG. 1, the bottom surface 90 of the attachment 16 is orientated to face the attaching surface 14 of the electrical connection box main body 12, and the pair of rotary portions 96 are inserted into the pair of supporting portions 37 of the electrical connection box main body 12. Thus, a hinge mechanism is constituted by the pair of rotary portions 96 provided on the other end side of the attachment 16 and the pair of supporting portions 37 provided on the other end side of the attaching surface 14. In other words, the other end side of the attaching surface 14 and the other end side of the attachment 16 are attached to each other so as to be rotatable using the hinge mechanism, which is detachable.

Then, the attachment 16 is rotated about the pair of rotary portions 96, and is aligned with and attached to the attaching surface 14 of the electrical connection box main body 12. As a result, the lock-target portion 94 provided on the one end side of the attachment 16 interlocks with the lock portion 33 provided on the same side, i.e., the one end side, of the electrical connection box main body 12, and the attachment 16 is fixed to the electrical connection box main body 12. Thus, assembly is complete. In such an attached state, the attachment-side connector 92 provided on the attachment 16 is inserted into the main body-side connector 74 that protrudes from the attaching surface 14, and the terminals 76 provided in the main body-side connector 74 are connected to female terminals (not shown) that are provided in the attachment-side connector 92. As a result, the circuit board 24 of the electrical connection box main body 12 and the circuit board of the attachment 16 are electrically connected to each other. Also, as shown in FIG. 1, in such an attached state, protruding end portions of the housing peripheral walls 60 of the connector attaching portions 58*a*-1 to 58*a*-3 and 58*b*-1 to 58*b*-5, which are lateral electrical component attaching portions provided so as to laterally protrude from the outer peripheral portions 54*b* and 54*d* of the circuit board 24, protrude outward from the lateral windows 30 that are provided penetrating through the lateral surfaces of the electrical connection box main body 12 (see FIGS. 2, 4, and 6), and a connector, which is not shown, is connected to the connector attachment portions 58. The electrical connection box 10 having such a structure is mounted on a vehicle such that the main body-side connector 74 of the electrical connection box main body 12 is located on the upper side and the main body-side connector 74 protrudes from the opening 36 in a horizontal direction.

In such an attached state, as shown in FIG. 6, a first drainage channel 98 is formed in the electrical connection box main body 12. The first drainage channel 98 includes: the pair of first downwardly-inclined surfaces 82 provided in the upper surface 80 of the housing peripheral wall 78 of the main body-side connector 74; a second downwardly-inclined surface 104 that is located on one side of the main body-side connector 74 in the lengthwise direction (the left side in FIG. 6), and is provided on an upper surface of the connecting wall 40 that extends along a separation gap 102 between the upper surface 80 of the housing peripheral wall 78 of the main body-side connector 74 and an upper surface 100 of the housing peripheral wall 60*b*-1 of the connector attachment portion 58*b*-1 to close the separation gap 102; and bottom-side extension portions 106 (see FIG. 5) that have a substantially recessed groove-like shape and constitute third downwardly-inclined surfaces (described later) that are provided within upper surfaces 100 of the housing peripheral walls 60*a*-1 and 60*b*-1 of the connector attachment portions 58*a*-1 and 58*b*-1. Here, the upper surface 80 of the housing peripheral wall 78 of the main body-side connector 74 is inclined downward toward the connecting wall 40, and the upper surface of the connecting wall 40 is inclined downward from the main body-side connector 74 toward the connector attachment portion 58*b*. Also, a separation gap (a gap in the left-right direction in FIG. 6) is not present between the upper surface 80 of the housing peripheral wall 78 of the main body-side connector 74 and the upper surface 100 of the housing peripheral wall 60*a*-1 of the connector attachment portion 58*a*-1, and therefore there is no need to provide the connecting wall 40 on the other side of the main body-side connector 74 in the lengthwise direction (the right side in FIG. 6). In FIG. 6, in order to facilitate understanding, the connecting wall 40 and the waterproofing walls 42 provided on the upper casing 20 are represented as imaginary lines.

Figure 3:
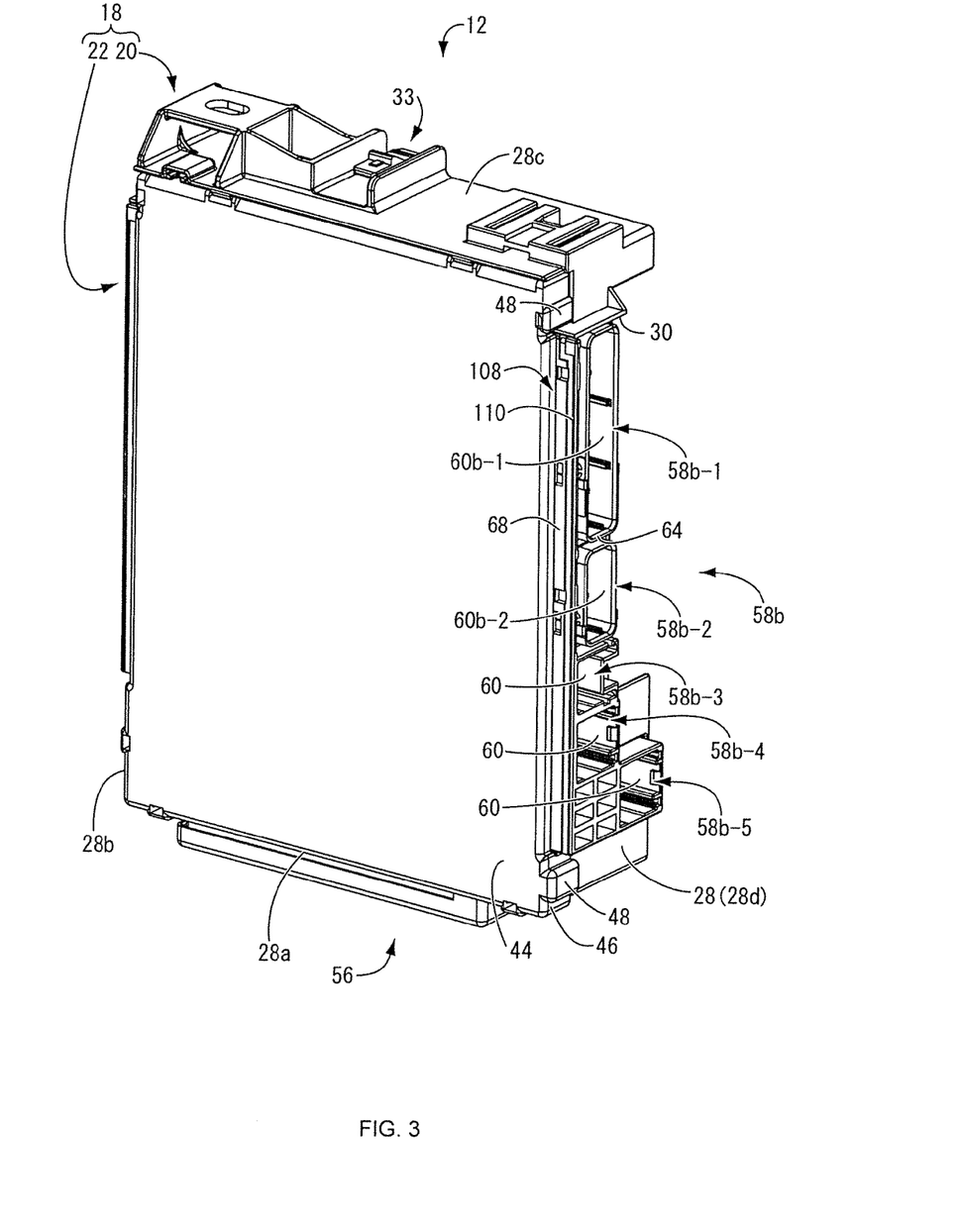
FIG. 3 is a perspective view of the electrical connection box main body shown in FIG. 2 viewed from a rear side.

In addition, as shown in FIGS. 2 and 3, the protruding end portions of the housing peripheral walls 60 of the connector attaching portions 58*a*-1 to 58*a*-3 and 58*b*-1 to 58*b*-5 include bottom-side end portions 108 that protrude outward from the lateral windows 30 on the sides of the bottom surface (on the sides of the lower casing 22) of the electrical connection box main body 12. Such bottom-side end portions 108 are constituted by the outer peripheral wall portions 68 that cover the entirety of the housing peripheral walls 60 of the connector attachment portions 58*a*-1 to 58*a*-3 and 58*b*-1 to 58*b*-5 from outer periphery sides. The outer peripheral wall portions 68 have a size that is sufficient to extend from the upper ends to the lower ends of the lateral windows 30. Also, second drainage channels 110 are provided so as to have a substantially recessed groove-like shape and extend from the upper ends to the lower ends of the outer surfaces of the outer peripheral wall portions 68 on the bottom surface side (see FIG. 3). In other words, the second drainage channels 110 are provided by extending the bottom-side end portions 108 downward. In addition, as shown in FIG. 5, the bottom-side extension portions 106 that extend toward the bottom-side end portions 108 are provided on the upper surfaces 100 of the housing peripheral walls 60*a*-1 and 60*b*-1 of the connector attachment portions 58*a*-1 and 58*b*-1, and the first drainage channel 98 includes the bottom-side extension portions 106. Thus, the second drainage channels 110 that extend downward and whose upper end portions are connected to the bottom-side extension portions 106 that are included in the first drainage channel 98 are provided in the bottom-side end portions 108 of the protruding end portions of the housing peripheral walls 60 of the connector attaching portions 58*a*-1 to 58*a*-3 and 58*b*-1 to 58*b*-5.

Also, in such an attached state, as shown in FIG. 6, the pair of waterproofing walls 42 are provided so as to protrude from the upper casing 20 of the electrical connection box main body 12 toward separation gaps 64 between the two housing peripheral walls 60*a*-1 and 60*a*-2 and between the two housing peripheral walls 60*b*-1 and 60*b*-2, and water that has been guided downward through the water removal holes 70 is advantageously prevented from entering the inside.

With the drainage structure for the electrical connection box 10 according to the present embodiment, the attachment 16, which is a separate member, is attached to the attaching surface 14 of the electrical connection box main body 12, and hence the electrical component attaching portions that are connected to the circuit board 24 in the electrical connection box main body 12 are provided on the lateral surfaces of the electrical connection box main body 12. Therefore, considering the ease of assembly, the electrical connection box 10 is attached to a vehicle in a so-called vertical orientation, in which the main body-side connector 74 is located on the upper side and protrudes from the opening 36 in a horizontal direction. If such a configuration is employed, there is the risk of water entering the inside from the opening 36 of the electrical connection box main body 12 located on the upper side. According to the present embodiment, the first drainage channel 98 includes: the pair of first downwardly-inclined surfaces 82 that are provided in the upper surface 80 of the housing peripheral wall 78 of the main body-side connector 74; the second downwardly-inclined surface 104 that is provided in the upper surface of the connecting wall 40; and the bottom-side extension portions 106 that constitute the third downwardly-inclined surfaces that are provided in the upper surfaces 100 of the connector attachment portions 58*a*-1 and 58*b*-1. In other words, there are surfaces that are inclined downward from the upper surface 80 of the housing peripheral wall 78 of the main body-side connector 74 to the upper surfaces 100 of the housing peripheral walls 60*a*-1 and 60*b*-1 of the connector attachment portions 58*a*-1 and 58*b*-1, and therefore, water that has entered the inside from the opening 36 of the electrical connection box main body 12 located on the upper side can be immediately guided to the upper surfaces 100 of the connector attachment portions 58*a*-1 and 58*b*-1. Furthermore, the second drainage channels 110 that extend downward and are connected to the bottom-side extension portions 106 that constitute the first drainage channel 98 in the upper surfaces 100 are provided in the protruding end portions of the housing peripheral walls 60 of the connector attaching portions 58*a*-1 to 58*a*-3 and 58*b*-1 to 58*b*-5. The protruding end portions protrude to the outside from the lateral windows 30 of the electrical connection box main body 12. Therefore, water in the first drainage channel 98 is guided by the second drainage channels 110 that are provided in the protruding end portions of the housing peripheral walls 60 that protrude to the outside of the electrical connection box main body 12, and is drained downward, outside the electrical connection box main body 12. Thus, the circuit board 24 and so on in the electrical connection box 10 are more reliably prevented from getting wet. In addition, the second drainage channels 110 are provided by utilizing the housing peripheral walls 60 of the connector attaching portions 58*a*-1 to 58*a*-3 and 58*b*-1 to 58*b*-5 that protrude to the outside of the electrical connection box main body 12. Therefore, it is possible to efficiently prompt water to drain to the outside without increasing the size or the number of components of the electrical connection box 10.

In addition, the first drainage channel 98 is formed with excellent spatial efficiency by employing a simple configuration in which the upper surface 80 of the housing peripheral wall 78 of the main body-side connector 74, the upper surface of the connecting wall 40, and the upper surfaces 100 of the housing peripheral walls 60*a*-1 and 60*b*-1 of the connector attachment portions 58*a*-1 and 58*b*-1 are inclined downward. Also, the upper surface 80 of the housing peripheral wall 78 of the main body-side connector 74 includes the pair of first downwardly-inclined surfaces 82 that are inclined downward from a central portion of the upper surface 80 in the widthwise direction toward the side edge portions on the two sides in the widthwise direction. Therefore, water can be immediately guided to the side edge portions on the two sides regardless of where water flows to on the upper surface 80. In addition, if the main body-side connector 74 and the connector attachment portion 58*a*-1 are separated from each other in the lengthwise direction of the main body-side connector 74, the first drainage channel 98 can be efficiently formed by employing a configuration in which the connecting wall 40 that closes the separation gap 102 is provided on the upper casing 20 of the electrical connection box main body 12 so as to extend along the separation gap 102 between the main body-side connector 74 and the connector attachment portion 58*a*-1, and the upper surface of the connecting wall 40 is inclined downward toward the connector attachment portion 58*a*-1.

Furthermore, the second drainage channels 110 are provided on the bottom surface side of the electrical connection box main body 12 (the lower casing 22 side), i.e., on the side opposite the attaching surface 14 of the attachment 16, which is a separate member. In summary, the second drainage channels 110 that are provided outside the electrical connection box main body 12 are not provided on the top surface side, but on the back surface side, of the circuit board 24 in the electrical connection box main body 12, and therefore it is possible to more reliably prevent the electronic components 50, 52, and so on that are mounted on the top surface of the internal circuit board 24 from getting wet. Also, the bottom-side end portions 108 that are located on the side of the bottom surface (on the side of the lower casing 22) of the electrical connection box main body 12 and protrude to the outside from the lateral windows 30 has a double-walled structure that includes the outer peripheral wall portions 68 that extend from the upper ends to the lower ends of the lateral windows 30 and cover the outer peripheries of the housing peripheral walls 60 on the side of the bottom surface from outer periphery sides. Also, the second drainage channels 110 are provided so as to have a substantially recessed groove-like shape and extend from the upper ends to the lower ends of the outer surfaces of the outer peripheral wall portions 68 on the bottom surface side. Therefore, it is possible to more reliably guide water to the outside of the electrical connection box main body 12 and advantageously prevent water from entering the inside. In addition, the bottom-side extension portions 106 that extend toward the bottom-side end portions 108 are provided on the upper surfaces 100 of the housing peripheral walls 60*a*-1 and 60*b*-1 of the connector attachment portions 58*a*-1 and 58*b*-1. Therefore, the first drainage channel 98 and the second drainage channels 110 are reliably connected to each other, and it is possible to perform more reliable waterproofing and more immediate drainage.

In addition, the drainage holes 72 are provided in the lower end portions of the housing peripheral walls 60*a*-2 and 60*b*-2, from among the housing peripheral walls 60 of the connector attaching portions 58*a*-1 to 58*a*-3 and 58*b*-1 to 58*b*-5, in the state of being mounted on a vehicle, so as to penetrate through the lower end portions downward. Therefore, even if water enters the inside of the housing peripheral walls 60*a*-2 and 60*b*-2, it is possible to drain water from the drainage holes 72 to the outside. Also, the pair of two housing peripheral walls 60*a*-1 and 60*a*-2, and the pair of two housing peripheral walls 60*b*-1 and 60*b*-2, are each provided adjacent to each other with the separation gap 64 therebetween. Even in the case where the water removal holes 70 are provided in the bottom walls 69, within the separation gaps 64, the pair of waterproofing walls 42 that protrude from the upper casing 20 of the electrical connection box main body 12 are provided in the separation gaps 64. Therefore, even if water enters the inside from the water removal holes 70 in the separation gaps 64, the waterproofing walls 42 advantageously prevent water from reaching the internal circuit board 24.

Although an embodiment of the present invention has been described in detail, the present invention is not limited to the specific descriptions thereof. For example, in the above-described embodiment, the bottom-side extension portions 106 that are provided on the upper surfaces 100 of the housing peripheral walls 60*a*-1 and 60*b*-1 of the connector attachment portions 58*a*-1 and 58*b*-1, have a recessed groove-like shape, and constitute the first drainage channel 98 are connected to the second drainage channels 110. However, the bottom-side extension portions 106 that constitute the first drainage channel 98 may be connected to the second drainage channels 110 by, for example, forming bottom-side extension portions 106 that have a tapered surface shape and collect water toward the second drainage channels 110, on the upper surfaces 100 of the housing peripheral walls 60*a*-1 and 60*b*-1 of the connector attachment portions 58*a*-1 and 58*b*-1. Also, in the above-described embodiment, the upper surface 80 of the housing peripheral wall 78 includes the pair of first downwardly-inclined surfaces 82 that are respectively inclined downward from a central portion of the upper surface 80 in the widthwise direction toward the side edge portions on the two sides in the widthwise direction. However, the upper surface 80 may be constituted by a first downwardly-inclined surface that is inclined downward from one end portion to the other end portion in the widthwise direction. Thus, water may be drained to a second drainage channel 110 via a bottom-side extension portion 106 that is provided on one of the upper surfaces 100 of the housing peripheral walls 60*a*-1 and 60*b*-1 of the connector attachment portions 58*a*-1 and 58*b*-1.

What is claimed is:

1. A drainage structure for an electrical connection box, comprising:

an electrical connection box main body; and an attachment that is a separate member and is aligned with and attached to an attaching surface that is provided within a top surface of the electrical connection box main body, wherein an opening is provided in the attaching surface of the electrical connection box main body so as to penetrate therethrough, a main body-side connector protrudes to the outside via the opening, the main body-side connector being provided on a circuit board in the electrical connection box main body so as to protrude therefrom, and an attachment-side connector is provided on an alignment surface of the attachment so as to protrude therefrom, and the attachment is aligned with and attached to the electrical connection box main body, and thus the main body-side connector and the attachment-side connector are connected to each other, wherein the electrical connection box main body is configured to be mounted on a vehicle such that the main body-side connector is located on an upper side and protrudes from the opening in a horizontal direction, a lateral window is provided in a lateral surface of the electrical connection box main body so as to penetrate therethrough, and a protruding end portion of a housing peripheral wall of a lateral electrical component attaching portion protrudes to the outside from the lateral window, the lateral electrical component attaching portion being provided on a side edge portion of the circuit board so as to protrude in a lateral direction therefrom, a first drainage channel that is inclined downward from an upper surface of a housing peripheral wall of the main body-side connector toward an upper surface of the housing peripheral wall of the lateral electrical component attaching portion is provided inside the electrical connection box main body, and a second drainage channel that extends downward and whose upper end portion is connected to the first drainage channel is provided in the protruding end portion of the housing peripheral wall of the lateral electrical component attaching portion.

2. The drainage structure for an electrical connection box according to claim 1,
wherein a casing of the electrical connection box main body is provided with a connecting wall that extends in a lengthwise direction of the main body-side connector along a separation gap between the upper surface of the housing peripheral wall of the main body-side connector and the upper surface of the housing peripheral wall of the lateral electrical component attaching portion to close the separation gap,
the upper surface of the housing peripheral wall of the main body-side connector is inclined downward toward the connecting wall, and the upper surface of the connecting wall is inclined downward from the main body-side connector toward the lateral electrical component attaching portion, and
the first drainage channel includes the upper surface of the housing peripheral wall of the main body-side connector, the upper surface of the connecting wall, and the upper surface of the housing peripheral wall of the lateral electrical component attaching portion.

3. The drainage structure for an electrical connection box according to claim 1,
wherein the protruding end portion of the housing peripheral wall of the lateral electrical component attaching portion includes a bottom-side end portion that is located on the side of a bottom surface of the electrical connection box main body and protrudes outward from the lateral window, and
the second drainage channel is provided by extending the bottom-side end portion downward, the upper surface of the housing peripheral wall of the lateral electrical component attaching portion is provided with a bottom-side extension portion that extends toward the bottom-side end portion of the lateral electrical component attaching portion, and the first drainage channel includes the bottom-side extension portion.

4. The drainage structure for an electrical connection box according to claim 1,
wherein the protruding end portion of the housing peripheral wall of the lateral electrical component attaching portion includes a bottom-side end portion that is located on the side of a bottom surface of the electrical connection box main body and protrudes outward from the lateral window,
the bottom-side end portion has a double-walled structure that includes an outer peripheral wall portion that extends from an upper end to a lower end of the lateral window and covers the housing peripheral wall from an outer periphery side, and
the second drainage channel is provided so as to extend from an upper end to a lower end of the outer peripheral wall portion.

5. The drainage structure for an electrical connection box according to claim 4,
wherein a drainage hole is provided in a lower end portion of the housing peripheral wall of the lateral electrical component attaching portion so as to penetrate through the lower end portion downward, the lower end portion being located on the lower side when in the state of being mounted on the vehicle.

6. The drainage structure for an electrical connection box according to claim 1,
wherein the lateral electrical component attaching portion that protrudes from the lateral window of the electrical connection box main body includes a plurality of lateral electrical component attaching portions, and the casing of the electrical connection box main body is provided with a waterproofing wall that is inserted into a separation gap between the housing peripheral walls of the plurality of lateral electrical component attaching portions and protrudes therefrom to prevent water from entering the inside from the separation gap.

7. The drainage structure for an electrical connection box according to claim 1,
wherein the first drainage channel includes a pair of downwardly-inclined surfaces that are respectively inclined downward from a central portion of the upper surface of the housing peripheral wall of the main body-side connector in a widthwise direction toward the side edge portions on two sides in the widthwise direction.

8. The drainage structure for an electrical connection box according to claim 2, wherein the protruding end portion of the housing peripheral wall of the lateral electrical component attaching portion includes a bottom-side end portion that is located on the side of a bottom surface of the electrical connection box main body and protrudes outward from the lateral window, and
the second drainage channel is provided by extending the bottom-side end portion downward, the upper surface of the housing peripheral wall of the lateral electrical component attaching portion is provided with a bottom-side extension portion that extends toward the bottom-side end portion of the lateral electrical component attaching portion, and the first drainage channel includes the bottom-side extension portion.

9. The drainage structure for an electrical connection box according to claim 2, wherein the protruding end portion of the housing peripheral wall of the lateral electrical component attaching portion includes a bottom-side end portion that is located on the side of a bottom surface of the electrical connection box main body and protrudes outward from the lateral window, the bottom-side end portion has a double-walled structure that includes an outer peripheral wall portion that extends from an upper end to a lower end of the lateral window and covers the housing peripheral wall from an outer periphery side, and the second drainage channel is provided so as to extend from an upper end to a lower end of the outer peripheral wall portion.

10. The drainage structure for an electrical connection box according to claim 3, wherein the protruding end portion of the housing peripheral wall of the lateral electrical component attaching portion includes a bottom-side end portion that is located on the side of a bottom surface of the electrical connection box main body and protrudes outward from the lateral window, the bottom-side end portion has a double-walled structure that includes an outer peripheral wall portion that extends from an upper end to a lower end of the lateral window and covers the housing peripheral wall from an outer periphery side, and the second drainage channel is provided so as to extend from an upper end to a lower end of the outer peripheral wall portion.

11. The drainage structure for an electrical connection box according to claim 2, wherein the lateral electrical component attaching portion that protrudes from the lateral window of the electrical connection box main body includes a plurality of lateral electrical component attaching portions, and the casing of the electrical connection box main body is provided with a waterproofing wall that is inserted into a separation gap between the housing peripheral walls of the plurality of lateral electrical component attaching portions and protrudes therefrom to prevent water from entering the inside from the separation gap.

12. The drainage structure for an electrical connection box according to claim 3, wherein the lateral electrical component attaching portion that protrudes from the lateral window of the electrical connection box main body includes a plurality of lateral electrical component attaching portions, and the casing of the electrical connection box main body is provided with a waterproofing wall that is inserted into a separation gap between the housing peripheral walls of the plurality of lateral electrical component attaching portions and protrudes therefrom to prevent water from entering the inside from the separation gap.

13. The drainage structure for an electrical connection box according to claim 3, wherein the lateral electrical component attaching portion that protrudes from the lateral window of the electrical connection box main body includes a plurality of lateral electrical component attaching portions, and the casing of the electrical connection box main body is provided with a waterproofing wall that is inserted into a separation gap between the housing peripheral walls of the plurality of lateral electrical component attaching portions and protrudes therefrom to prevent water from entering the inside from the separation gap.

14. The drainage structure for an electrical connection box according to claim 4, wherein the lateral electrical component attaching portion that protrudes from the lateral window of the electrical connection box main body includes a plurality of lateral electrical component attaching portions, and the casing of the electrical connection box main body is provided with a waterproofing wall that is inserted into a separation gap between the housing peripheral walls of the plurality of lateral electrical component attaching portions and protrudes therefrom to prevent water from entering the inside from the separation gap.

15. The drainage structure for an electrical connection box according to claim 5, wherein the lateral electrical component attaching portion that protrudes from the lateral window of the electrical connection box main body includes a plurality of lateral electrical component attaching portions, and the casing of the electrical connection box main body is provided with a waterproofing wall that is inserted into a separation gap between the housing peripheral walls of the plurality of lateral electrical component attaching portions and protrudes therefrom to prevent water from entering the inside from the separation gap.

* * * * *